Figure 1:
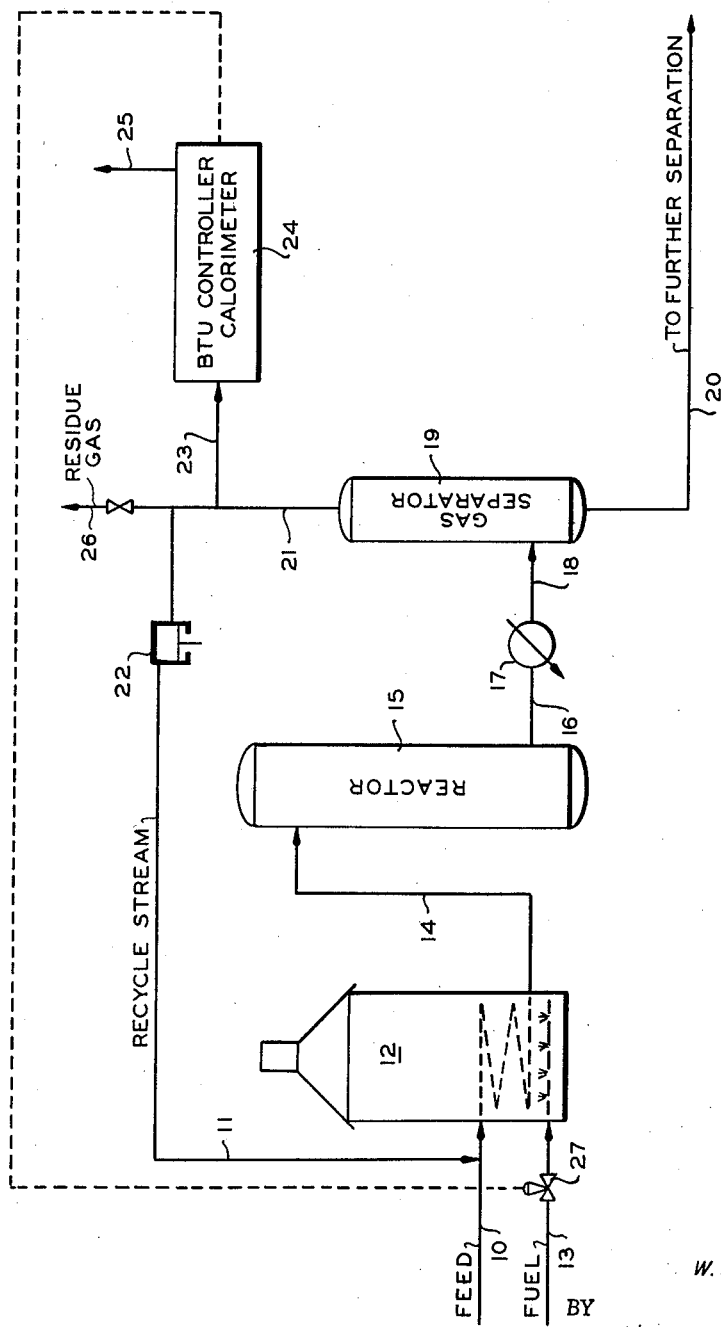

Dec. 15, 1959  W. H. DENNIS, JR  2,917,454
REFORMING PROCESS
Filed April 25, 1957  3 Sheets-Sheet 1

INVENTOR.
W. H. DENNIS, JR.
BY
Hudson & Young
ATTORNEYS

INVENTOR.
W. H. DENNIS, JR.
BY
Hudson & Young
ATTORNEYS

Dec. 15, 1959

W. H. DENNIS, JR 2,917,454

REFORMING PROCESS

Filed April 25, 1957

3 Sheets-Sheet 3

INVENTOR.
W. H. DENNIS, JR.

BY Hudson + Young

ATTORNEYS

# United States Patent Office 2,917,454
Patented Dec. 15, 1959

2,917,454

REFORMING PROCESS

William H. Dennis, Jr., Cleveland, Ohio, assignor to Phillips Petroleum Company, a corporation of Delaware Application April 25, 1957, Serial No. 655,057

19 Claims. (Cl. 208—134)

This invention relates to the catalytic conversion of hydrocarbon fractions. In one of its aspects, this invention relates to a method of reforming petroleum streams in the presence of a catalyst. In another of its aspects, this invention relates to an improved method for reforming hydrocarbon fractions in the presence of a catalyst containing a metal of the platinum group.

Catalytic reforming processes have found widespread use in the petroleum industry for improving the antiknock characteristics of straight-run fractions containing naphthenic hydrocarbons, as well as paraffinic hydrocarbons and varying proportions of aromatic hydrocarbons. The catalyst used generally comprises a metal of the platinum group supported on an alumina support and promoted with a halogen compound, particularly fluorine or chlorine. The catalyst promotes a number of reactions, including the production of aromatics from naphthenes and from long-chain paraffins, isomerization of paraffins and naphthenes, and hydrocracking of paraffins. In order to have an economically successful reforming process, it is necessary to control the balance between the various reactions promoted by the catalyst.

The cracking reaction, wherein carbon to carbon bonds are split, is the key reaction in maintaining the balance between the various reactions. For example, if it is desired to alter the quality of the reformate being produced or the product distribution being obtained, promotion of the hydrocracking reaction relative to the amount of aromatization results in an increase in the production of methane and other light hydrocarbons, whereas reduction of the hydrocracking reaction relative to the amount of aromatization results in the production of an increased amount of hydrogen. Furthermore, since the hydrocracking activity of the catalyst declines more rapidly than the aromatizing activity, it is necessary to increase the rate of hydrocracking where it is desirable to maintain the relative amounts of aromatization and hydrocracking substantially constant.

The hydrocracking reaction must be selective and must be controlled in order not to result in the decomposition of normally liquid hydrocarbons into normally gaseous hydrocarbons. The desired selective hydrocracking generally comprises the splitting of a higher boiling hydrocarbon molecule into 2 molecules, both of which are normally liquid hydrocarbons. It also involves, to a lesser extent, the removal of methyl, ethyl and propyl groups from long-chain hydrocarbons in the form of methane, ethane and propane. Unless the removal of these radicals is controlled so that not more than 1 or possibly 2 of such radicals are removed from a given molecule, the hydrocracking reaction will result in the decomposition of the long-chain hydrocarbon into normally gaseous hydrocarbons. Another disadvantage of nonselective or uncontrolled hydrocracking is the formation of large quantities of coke or carbonaceous material which deposits on the catalyst and decreases or destroys its activity. The deposition of this carbonaceous material on the catalyst results in shorter processing cycles or periods and requires more frequent regeneration of the catalyst. When the catalyst activity is destroyed completely by the deposition of such carbonaceous material, the reforming unit must be shut down so that the old catalyst can be removed and replaced with new catalyst.

An object of this invention is to provide an improved reforming process. Another object of this invention is to provide an improved reforming process wherein the balance between the various reactions promoted by the catalyst is controlled. Another object of this invention is to provide an automatic process for regulating the activity of a catalyst of the platinum group in a reforming process. Another object of this invention is to provide an improved reforming process wherein the quality of the reformate produced is automatically regulated. Another object of this invention is to provide an improved reforming process wherein an improved yield of reformate is obtained. Another object of this invention is to provide an improved reforming process wherein there is a minimum amount of coke deposition on the catalyst.

Other aspects, objects and advantages of the invention are apparent from a consideration of the accompanying disclosure, drawings and the appended claims.

I have discovered that there is a correlatable change in the ratio of hydrogen to methane in the gaseous effluent from a reforming reaction zone when the change in the degree of hydrocracking in the reforming reaction zone is sufficiently great to cause an unbalance of reactions in the reforming reaction zone. Further, I have discovered that this correlatable change in the ratio of hydrogen to methane in the gaseous effluent from a reforming reaction zone can be detected by measuring the heating value of the gaseous effluent from the reforming reaction zone.

In accordance with this invention, there is provided an improved reforming process, and apparatus for performing said process, wherein the activity of the catalyst is automatically regulated in accordance with the proportion of the different products obtained in the reforming reactions. More specifically, this invention provides an improved reforming process wherein the balance between the different reactions promoted by the catalyst is controlled in accordance with the composition of the gaseous effluent stream of the reaction zone. Still more specifically, this invention provides an improved reforming process wherein the degree of hydrocracking occurring in the reforming reaction, which is promoted by a catalyst containing a metal of the platinum group, is controlled in accordance with the heating value of the gaseous effluent stream produced in the reforming zone.

In one embodiment of this invention, the degree of hydrocracking in the reforming reaction is automatically controlled by regulating the reaction temperature in the reforming reaction zone in accordance with the heating value of the gaseous effluent recovered from the reforming zone. Preferably, the reaction temperature in the reforming zone is regulated by controlling the degree of preheat of the feed stream supplied to the reforming zone. Thus, as the degree of hydrocracking in the reforming zone decreases, the amount of fuel supplied to the furnace of the preheater is automatically increased in accordance with the heating value of the gaseous effluent stream from the reforming zone to raise the temperature of the feed stream and increase the reaction temperature in the reforming zone, which results in an increase in the hydrocracking activity of the catalyst.

In another embodiment of this invention, the hydrocracking activity of the catalyst is controlled by regulating the partial pressure of water in the reforming zone in accordance with the heating value of the gaseous stream recovered from the gas separator into which the effluent from the reforming zone is discharged. The addition of the water may be either to the feed stock or directly into the reforming zone. Although water or water in the form of steam is preferred in this embodiment, compounds which liberate water under the conditions prevailing in the reforming zone, such as alcohols, hydroperoxides, and phenols, may be used in the place of water. In this embodiment, the addition of water in the reforming zone suppresses the activity of the catalyst with respect to the hydrocracking reaction so that the degree of hydrocracking in the reforming zone is automatically controlled in accordance with the heating value of the gaseous effluent produced in the reforming zone.

In another embodiment of this invention, the hydrocracking activity of the catalyst is regulated by controlling the amount of halogen compound present in the reforming reaction zone is accordance with the heating value of the gaseous stream recovered from the gas separator into which the effluent from the reforming zone was discharged. The addition of the halogen compound may be either to the feed stream or directly into the reforming reaction zone. The halogen compound can be any halogen compound which promotes the hydrocracking activity of the catalyst and is usually a compound of chlorine or fluorine. Examples of some halogen compounds which can be used in this embodiment include chlorine, hydrogen chloride, ammonium chloride, carbon tetrachloride, chloroform, tertiary butylchloride, fluorine, hydrogen fluoride, tertiary butylfluoride, bromine, hydrogen bromide and dichloro-difluoromethane. In this embodiment, the addition of the halogen compound is automatically controlled in accordance with the heating value of the gaseous effluent from the reforming reaction zone, so that hydrocracking activity of the catalyst is automatically maintained at a constant level.

The gaseous stream recovered from the gas separator located downstream from the reforming reactor contains varying amounts of hydrogen, methane, ethane and other gaseous constituents, the proportion of the various constituents depending upon the degree of hydrocracking in the reforming zone. For example, if the catalyst has a high hydrocracking activity, the proportion of methane and other light hydrocarbon gases in the gaseous effluent is high, resulting in the gaseous effluent having a high B.t.u. content or a high heating value. Conversely, when the hydrocracking activity of the catalyst is low, the proportion of the hydrogen in the gaseous effluent is high so that the B.t.u. content of the gaseous effluent is low. In order to maintain a balance between the reactions taking place in the reforming zone, this invention maintains substantially constant the B.t.u. content of the gaseous effluent at all times. The B.t.u. content of this gaseous stream can be measured by any continuous control means responsive to B.t.u. value, such as a recording, controlling calorimeter, well known in the art. If desired, other measuring means indicative of the composition of the gaseous effluent can be used, such as, a recording, controlling spectrophotometer using ultraviolet or infrared rays or a recording, controlling gravitometer. These devices are well known to those skilled in the art and are readily commercially available. Reference is made to U.S. Patents 2,547,970 (1951), 2,564,791 (1951), and 2,771,149 (1956), for a description of the construction and operation of such control devices. In the operation of the automatic control device in this invention, the control device functions, whenever the B.t.u. content of the gaseous effluent from the reforming zone falls below a predetermined value, to increase the hydrocracking activity of the catalyst by either increasing the rate of addition of halogen compound into the reforming zone, reducing the rate of addition of water into the reforming zone, or by increasing the reaction temperature. Also, if the B.t.u. content of the gaseous stream is above a predetermined value, as when the catalyst has a high hydrocracking activity, the automatic control device functions to either increase the addition of water into the reforming zone, reduce the reaction temperature, or reduce the rate of addition of halogen compound into the reaction zone. Although the heating value of the gaseous effluent can be measured immediately after its discharge from the reforming zone, preferably the heating value of the gaseous stream recovered from the gas separator is measured. A portion of this gaseous stream after compression, is recycled back to the reaction zone in order to suppress the deposition of carbonaceous material on the catalyst and to furnish a portion of the hydrogen requirement of the reforming process. Of course, the total feed rate to the reforming zone must be constant in order for the change in the ratio of hydrogen to methane in the gaseous effluent to be correlatable with the degree of hydrocracking in the reforming zone.

Figure 2:
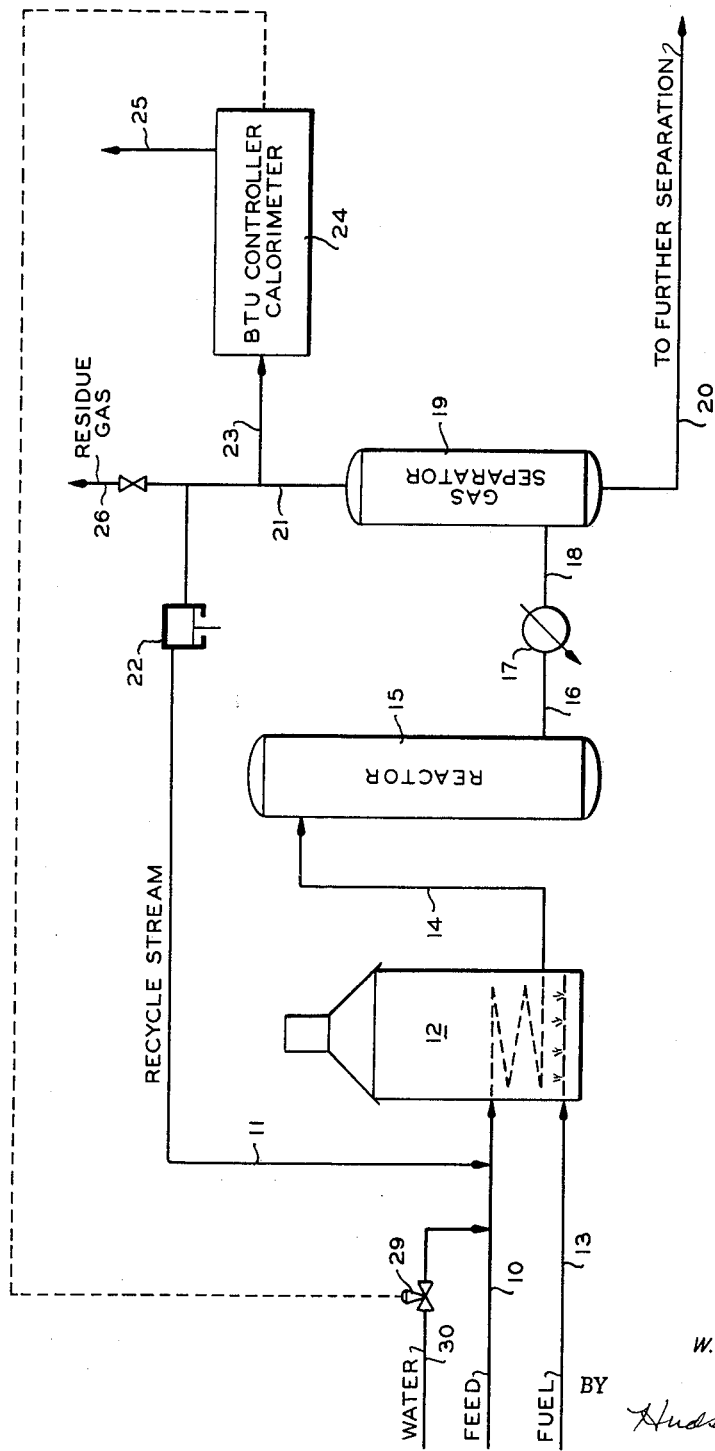
Figure 3:
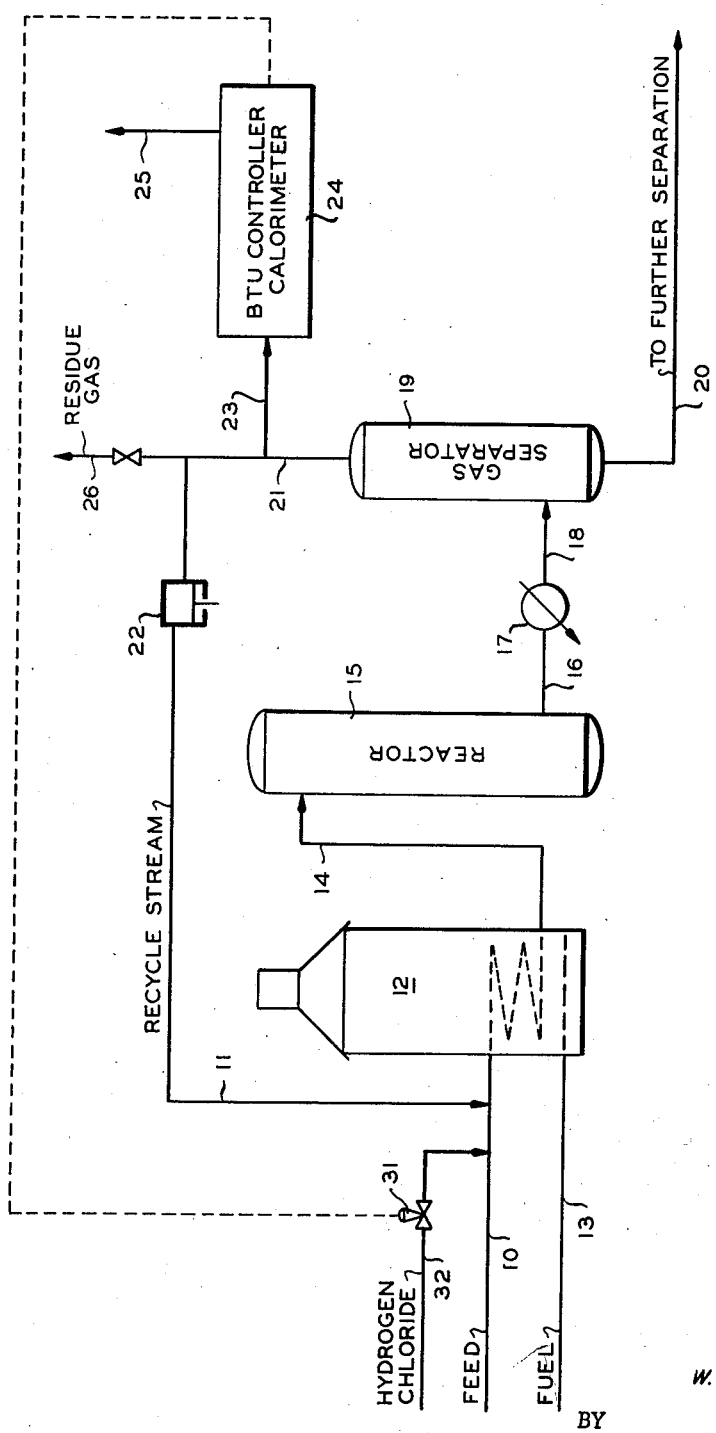

In the drawing, Figure 1 is a partial schematic flow diagram of a reforming process showing one embodiment of the invention wherein the hydrocracking activity of the catalyst is controlled by regulation of the reforming reaction zone temperature. Figure 2 is a partial schematic flow diagram of a reforming process showing another embodiment of the invention wherein the hydrocracking activity of the catalyst is controlled by regulation of the rate of addition of water into the reforming reaction zone. Figure 3 is a partial schematic flow diagram of the reforming process showing another embodiment of the invention wherein the hydrocracking activity of the catalyst is controlled by regulation of the rate of addition of a halogen compound into the reforming reaction zone.

Referring to Figure 1, a naphthenic gasoline boiling in the range of 100–450° F. is charged through line 10, together with a hydrogen-rich recycle stream entering through line 11, into furnace preheater 12 wherein the combined feed stock and recycled hydrogen are heated to reaction temperature by the combustion of fuel entering through line 13. The effluent from furnace preheater 12 is passed by line 14 into reactor 15 containing a platinum-type reforming catalyst. The reactor effluent, containing both liquid and gaseous phase constituents, is discharged from reactor 15 through line 16 into cooler 17 and then through line 18 into gas separator 19. The reformate separated from gas separator 19 in liquid phase is withdrawn through line 20 and passed to the conventional separation zone (not shown) wherein the desired products are recovered. The overhead, in gaseous phase, is withdrawn through line 21. A portion of this gaseous stream, which contains a large proportion of hydrogen, is compressed by compressor 22 and returned to reactor 15 by recycle through line 11 into line 10 through which the feed stream is introduced. A small continuous stream of this gaseous effluent is withdrawn from line 21 through line 23 and passed through B.t.u. controller calorimeter 24 before being discharged from the system through line 25. Any remaining portion of this gaseous stream which is not recycled through line 11 or which is not passed through B.t.u. controller calorimeter 24 is withdrawn from the system through line 26 as residue gas.

In the embodiment shown in Figure 1, B.t.u. controller calorimeter 24 regulates the activity of the catalyst in reactor 15 by controlling the flow of fuel through line 13 to preheater furnace 12 in response to the B.t.u. content of the gaseous stream withdrawn from gas separator 19 through line 21. B.t.u. controller calorimeter 24 is set to maintain a predetermined rate of flow of fuel to preheater furnace 12 so as to obtain a reaction temperature in reactor 15 which gives the desired balance between the different reactions taking place within reactor 15, as determined from the heating value of the gaseous stream separated in gas separator 19. Thus, if the B.t.u. content of gaseous stream 21 is higher than a predetermined value, indicating that there is less hydrogen and more light hydrocarbon therein, too much hydrocracking is occurring in reactor 15, and there is an unbalance of the various reactions. Under these conditions, B.t.u. controller calorimeter 24 operates to throttle motor valve 27 in fuel line 13 and thereby reduce the reaction temperature in reactor 15 by reducing the degree to which the feed stream entering through line 10 is preheated in preheater furnace 12. Conversely, if the B.t.u. content of gas stream 21 is below the predetermined value, indicating more hydrogen and less hydrocarbon, B.t.u. controller calorimeter 24 operates to open motor valve 27 and raise the reaction temperature in reactor 15 by increasing the flow of fuel to preheater furnace 12.

In the embodiment shown in Figure 2, the addition of water into the reaction zone is used to regulate the hydrocracking activity of the catalyst and reactor 15. In Figure 2, the same reference numerals are used for like parts shown in Figure 1. Also, the flow diagram of the reforming process is substantially the same as shown in Figure 1 except that in Figure 2 B.t.u. controller calorimeter 24 operates to control the position of motor valve 29 located in water line 30 through which water is injected into line 10 carrying the hydrocarbon stream to be reformed to preheater furnace 12. In this embodiment, B.t.u. controller calorimeter 24 is set for a predetermined B.t.u. value which gives the desired balance between the various reactions taking place in reactor 15 as determined by the proportion of hydrogen and light hydrocarbon gases in stream 21. If the hydrocracking activity of the catalyst is too high, as will be indicated by a high B.t.u. content in stream 21, B.t.u. controller calorimeter 24 operates to open motor valve 29 and increase the flow of water through line 30 into reactor 15 via lines 10 and 14 to suppress the hydrocracking activity of the catalyst. In the type of operation where the reaction conditions in reactor 15 are so regulated that it is necessary to maintain a continuous small flow of water into the reforming zone, water valve 29 can also be throttled whenever the hydrocracking activity decreases sufficiently to reduce the B.t.u. value of the gaseous stream in line 21 to a point below the predetermined B.t.u. value.

The embodiment as shown in Figure 3 utilizes the addition of hydrogen chloride into the reforming zone to control the hydrocracking activity of the catalyst. The flow diagram in this embodiment is similar to that described for Figures 1 and 2 except that B.t.u. controller calorimeter 24 operates in this embodiment to adjust the position of motor valve 31 and control the rate of addition of hydrogen chloride through line 32 into line 10 supplying the feed stream to reactor 15. In this embodiment, when the B.t.u. content of the gaseous stream in line 21 falls below a predetermined value, indicating that the hydrocracking activity of the catalyst is too low, B.t.u. controller calorimeter 24 operates to open motor valve 31 and increase the flow of hydrogen chloride into the reaction zone in reactor 15, thereby raising the hydrocracking activity of the catalyst. If a continuous flow of hydrogen chloride to the reaction zone is maintained at all times, B.t.u. controller calorimeter 24 can also operate to throttle motor valve 31, thereby decreasing the rate of flow of hydrogen chloride into the reaction zone, so that the hydrocracking activity of the catalyst in reactor 15 can be lowered whenever the heating value in gaseous stream in line 21 has become greater than the predetermined value.

It is within the scope of the invention to combine the embodiments shown in Figures 1, 2 and 3 in a single reforming process to regulate the hydrocracking activity of the catalyst as determined by the measurement of the heating value of the gaseous stream in line 21 as measured by B.t.u. controller calorimeter 24. In this case, the rate of fuel flow to preheater furnace 12 is established at a level to give a desired balance of reactions in reactor 15 and there is no addition of either water or hydrogen chloride into the reaction zone. Whenever the hydrocracking activity of the catalyst becomes too high, as measured by B.t.u. controller calorimeter 24, motor valve 29 is automatically opened to inject water into the reforming zone to suppress the hydrocracking activity of the catalyst. Also, if the hydrocracking activity of the catalyst should be depressed below that level which gives the desired balance between the reactions occurring in the reforming zone, B.t.u. controller calorimeter 24 operates to open valve 31 and inject hydrogen chloride into the reforming zone to raise the hydrocracking activity of the catalyst.

It is also within the scope of this invention to use any two of the three embodiments shown in Figures 1, 2 and 3 to regulate the hydrocracking activity of the catalyst. For example, the embodiment shown in Figures 2 and 3 can be combined so that water is injected into the reforming zone to suppress the hydrocracking activity of the catalyst and hydrogen chloride is injected into the reforming zone whenever it is necessary to raise the hydrocracking activity of the catalyst, as determined by heating value of the gaseous stream in line 21, as measured by B.t.u. controller 24.

The operating conditions maintained in the reforming zone ordinarily comprise a temperature in the range of 750–1000° F., preferably 800–950° F.; a pressure in the range of 300–900 p.s.i.a., preferably 500–700 p.s.i.a.; a weight liquid space velocity in the range of from about 2.8–8, preferably 4–6; and a mol ratio of hydrogen to charge in the range of about 2:1–10:1, preferably 4:1–9:1. Hydrocracking reactions are favored at temperatures within the range of from about 600–700° F. and at higher pressures whereas aromatization reactions are favored temperatures in the range from 650–1000° F. and at lower pressures. The temperature, pressure and space velocity are adjusted to produce the desired aromatization and hydrocracking as determined by the particular feed stock being treated and the particular products desired. The important feature of this invention is that the balance between the various reactions taking place in the reforming reaction zone is automatically maintained after the reaction conditions of temperature, pressure and space velocity have once been established.

The catalyst employed in the reforming reaction zone can be any of the well-known reforming catalysts and usually comprises alumina containing minor amounts of a metal of the platinum group, such as ruthenium, rhodium, palladium, osmium, iridium and platinum, promoted by a minor amount of combined halogen. A preferred type of catalyst is a chloride promoted platinum-alumina composition. Ordinarily, the amount of the platinum group in the composition will be within the range of from about 0.05 to about 1.5 weight percent; however, the composition may contain substantial amounts of the metal, if desired. The halogen is usually either chlorine or fluorine and the amount of such halogen in the composition is usually between about 0.1 and about 3.0 weight percent on a dry alumina basis. The method of preparing these catalysts is well known to those skilled in the art and usually comprises either a precipitation or an impregnation method. One method of preparing a suitable catalyst comprises neutralizing an aluminum chloride, aluminum sulfate or aluminum nitrate solution with an alkaline reagent, such as ammonium hydroxide or ammonium carbonate, to form aluminum hydroxide; treating the resulting aluminum hydroxide slurry with a halogen either in the form of an acid, such as hydrogen fluoride or hydrogen chloride, or in the form of a volatile salt such as ammonium fluoride or ammonium chloride; treating the resulting halogenated aluminum hydroxide slurry with a solution of chloroplatinic acid solution containing hydrogen sulfide; separating the resulting slurry by filtration; and heating the resultant composition to a temperature in the range of about 800–1200° F.

The hydrocarbon stocks which can be reformed in accordance with this invention are those consisting essentially of naphthenes and paraffins, although there may be small amounts of aromatics and olefins present. These hydrocarbon stocks include straight-run gasolines, natural gasoline, and the like, including thermally cracked gasoline in admixture therewith. Hydrocarbon fractions, commonly referred to as naphtha, are also suitable charge stocks. A suitable gasoline charge stock ordinarily has an initial boiling point within the range of from 50–100° F. and an end point boiling within the range of 325–425° F. whereas a suitable naphtha generally has an initial boiling point within the range of 125–250° F. and an end point boiling within the range of 350–425° F.

It is desirable to operate a reforming process to produce a maximum quantity of gasoline of the highest octane rating. In order to realize an optimum yield-octane relationship, hydrocracking occurs in the reforming process along with the desired formation of armatics and isoparaffins from naphthenics and normal paraffins in the charge material. The effect of hydrocracking is to decrease the gasoline yield and increase the production of light vapors and gases.

*Specific example*

Reactor 15:
  Pressure, p.s.i.g. _____ 500
  Temperature, ° F. _____ 900
  $H_2$/feed mol ratio _____ 8:1
  Weight hourly space velocity [1] _____ 2
Separator 19:
  Pressure, p.s.i.g. _____ 450
  Temperature, ° F. _____ 100

[1] Weight of hydrocarbon charged per hour per weight of catalyst in the reaction zone.

The catalyst employed for the reforming step is a platinum type supported on alumina and containing halogen. Specifically, the platinum content is 0.37 weight percent and the halogen comprises fluorine of 0.37 weight percent and chlorine of 0.27 weight percent.

The material charged to the process for reforming is a naphthenic type gasoline boiling in the range of 150 to 400° F. containing paraffins, naphthenics, and a small portion of aromatics. The specific charge material contains 46 volume percent normal and isoparaffins, 44 volume percent naphthenics, and 10 percent aromatics.

For optimum yield-octane relationship, the volume percent hydrogen desired in the gas from separator 19 in my specific operation is in the range of 88 to 95. Below 88 volume percent hydrogen, too much hydrocracking occurs resulting in lowered quantity of gasoline produced. Above 95 volume percent hydrogen, too little hydrocracking occurs resulting in the production of low octane reformate.

The B.t.u. content or heating value of the gas from separator 19 may range from 350 to 420 B.t.u. per standard cubic foot. Above 420 B.t.u./s.c.f., the system introduces water to suppress hydrocracking and hence decreasing the B.t.u. content of the gas (producing higher hydrogen purity). At below 350 B.t.u./s.c.f., the system introduces hydrogen chloride to increase the hydrocracking occurring in the reactor to that range to produce the desired yield-octane relationship.

Reasonable variation and modification are possible within the scope of the foregoing disclosure, drawings and the appended claims to the invention, the essence of which is that there has been provided an improved reforming process for maintaining the balance between the various reactions occurring in the reforming reaction zone, the improvement comprising regulating the hydrocracking activity of the catalyst by controlling either the reaction temperature, the rate of addition of water into the reaction zone, and/or the rate of addition of halogen into the reaction zone automatically in accordance with the heating value of the gaseous stream separated from the reaction zone effluent as determined by a suitable means for measuring heat content of a gaseous stream.

I claim:

1. In the reforming of a hydrocarbon charge stock by contacting said charge stock and hydrogen in a reforming reaction zone with a catalyst under reforming conditions, the improvement comprising automatically regulating the hydrocracking activity of the catalyst in accordance with the heating value of the gaseous reforming reaction zone effluent to maintain a balance between the various reactions occurring in said reforming reaction zone.

2. In the reforming of a hydrocarbon charge stock by contacting said charge stock and hydrogen in a reforming reaction zone with a catalyst under reforming conditions, the improvement comprising measuring the ratio of hydrogen to methane in the gaseous reforming reaction zone effluent and automatically regulating the hydrocracking activity of said catalyst in response to variations in the ratio of hydrogen to methane of said gaseous reforming reaction zone effluent so as to maintain said ratio of hydrogen to methane constant.

3. In the reforming of a hydrocarbon charge stock by contacting said charge stock and hydrogen in a reforming reaction zone with a catalyst under reforming conditions, the improvement comprising measuring the heating value of the gaseous reforming reaction zone effluent and automatically regulating the hydrocracking activity of said catalyst in response to variations in the heating value of said gaseous reforming reaction zone effluent so as to maintain said heating value constant by controlling the reaction temperature in said reforming reaction zone.

4. In the reforming of a hydrocarbon charge stock by contacting said charge stock and hydrogen in a reforming reaction zone with the catalyst under reforming conditions, the improvement comprising measuring the heating value of the gaseous reforming reaction zone effluent and automatically regulating the hydrocracking activity of said catalyst in response to variations in the heating value of said gaseous reforming reaction zone effluent so as to maintain said heating value constant by introducing a controlled amount of water into said reforming reaction zone.

5. In the reforming of a hydrocarbon charge stock by contacting said charge stock and hydrogen in a reforming reaction zone with a catalyst under reforming conditions, the improvement comprising measuring the heating value of the gaseous reforming zone effluent and automatically regulating the activity of said catalyst in response to variations in the heating value of said gaseous reforming reaction zone effluent so as to maintain said heating value constant by introducing a controlled amount of a halogen compound into said reforming reaction zone.

6. The process of claim 3 wherein said reaction temperature in said reforming reaction zone is established by regulation of flow of fuel to the furnace preheater within which the charge stock is heated before entering said reforming reaction zone.

7. The process of claim 4 wherein said controlled amount of water is introduced into said reforming reaction zone in admixture with said hydrocarbon charge stock.

8. The process of claim 5 wherein said controlled amount of halogen compound is introduced into said reforming reaction zone in admixture with said hydrocarbon charge stock.

9. The process of claim 4 wherein said controlled amount of water is introduced into said reforming reaction zone in the form of a compound which liberates water under reforming conditions.

10. The process of claim 5 wherein said halogen compound is a compound selected from the group consisting of fluorine, chlorine and bromine.

11. The process of claim 5 wherein said halogen compound is hydrogen chloride.

12. In the reforming of a hydrocarbon charge stock by contacting said charge stock in hydrogen in a reforming reaction zone with a catalyst under reforming conditions, the improvement comprising measuring the heating value of a gaseous reforming reaction zone effluent and automatically regulating the hydrocracking activity of said catalyst in response to variations in the heating value of said gaseous reforming reaction zone effluent so as to maintain said heating value constant by introducing a controlled amount of water into said reforming reaction zone when the hydrocracking activity of said catalyst is above a predetermined value and by introducing a controlled amount of a halogen compound into said reforming reaction zone when the hydrocracking activity of said catalyst is below a predetermined value.

13. In the reforming of a hydrocarbon charge stock by contacting said charge stock in hydrogen in a reforming reaction zone with a catalyst under reforming conditions, the improvement comprising measuring the heating value of a gaseous reforming reaction zone effluent recovered from a gas separation zone and regulating the hydrocracking activity of said catalyst in response to variations in the heating value of said gaseous reforming reaction zone effluent so as to maintain said heating value constant.

14. The process of claim 2 wherein said measuring of the ratio of hydrogen to methane of said gaseous reforming reaction zone effluent is made by passing at least a portion of said effluent through a zone wherein its heat content is released and automatically determined and wherein a condition affecting the activity of said catalyst is controlled responsive to said heat content.

15. The process of claim 2 wherein said measuring of the ratio of hydrogen to methane of said gaseous reforming reaction zone effluent is made by passing at least a portion of said effluent through a spectra measuring zone wherein the spectra of the constituents of said gaseous effluent are automatically determined and wherein a condition affecting the activity of said catalyst is automatically controlled responsive to said spectra.

16. The process of claim 2 wherein said measuring of the ratio of hydrogen to methane of said gaseous reforming reaction effluent is made by passing at least a portion of said effluent through a zone wherein its specific gravity is automatically determined and wherein a condition affecting the activity of said catalyst is controlled responsive to said specific gravity.

17. The combination comprising a first conduit for passage of a charge stream, a second conduit for passage of hydrogen chloride into said first conduit, a motor valve in said second conduit, a heating means for raising the temperature of said charge stream and said hydrogen chloride, a hydrocarbon conversion means in open communication with said heating means for reforming said charge stream, a gas separation means in open communication with said hydrocarbon conversion means for dividing the effluent from said hydrocarbon conversion zone into a normally gaseous stream and a normally liquid stream, a conduit for withdrawing the normally liquid stream from said gas separation means, a conduit for withdrawing the normally gaseous stream from said gas separation means, a conduit for returning a first portion of said normally gaseous stream to said heating means, a calorimeter for measuring the heat content of a gaseous stream, a conduit for passage of a second portion of said normally gaseous stream through said calorimeter, and means responsive to the heat content of said normally gaseous stream for activating said motor valve.

18. The combination comprising a first conduit for passage of a charge stream, a second conduit for passage of water into said first conduit, a motor valve in said second conduit, a heating means for raising the temperature of said charge stream and said water, a hydrocarbon conversion means in open communication with said heating means for reforming said charge stream, a gas separation means in open communication with said hydrocarbon conversion means for dividing the effluent from said hydrocarbon conversion zone into a normally gaseous stream and a normally liquid stream, a conduit for withdrawing the normally liquid stream from said gas separation means, a conduit for withdrawing the normally gaseous stream from said gas separation means, a conduit for returning a first portion of said normally gaseous stream to said heating means, a calorimeter for measuring the heat content of a gaseous stream, a conduit for passage of a second portion of said normally gaseous stream through said calorimeter, and means responsive to the heat content of said normally gaseous stream for activating said motor valve.

19. The combination comprising a heating means for raising the temperature of a charge stream, a first conduit for passage of said charge stream into said heating means, a conduit for passage of fuel into said heating means, a motor valve in said conduit for passage of fuel into said heating means, a hydrocarbon conversion means in open communication with said heating means for reforming said charge stream, a gas separation means in open communication with said hydrocarbon conversion means for dividing the effluent from said hydrocabon conversion zone into a normally gaseous stream and a normally liquid stream, a conduit for withdrawing the normally liquid stream from said gas separation means, a conduit for withdrawing the normally gaseous stream from said gas separation means, a conduit for returning a first portion of said normally gaseous stream to said heating means, a calorimeter for measuring the heat content of a gaseous stream, a conduit for passage of a second portion of said normally gaseous stream through said calorimeter, and means responsive to the heat content of said normally gaseous stream for activating said motor valve.

References Cited in the file of this patent

UNITED STATES PATENTS

| | | |
|---|---|---|
| 2,439,023 | Robinson | Apr. 6, 1948 |
| 2,485,073 | Shiffler et al. | Oct. 18, 1949 |
| 2,600,133 | Simms | June 10, 1952 |
| 2,625,504 | Haensel et al. | Jan. 13, 1953 |
| 2,642,383 | Berger et al. | June 16, 1953 |
| 2,642,384 | Cox | June 16, 1953 |
| 2,642,385 | Berger | June 16, 1953 |
| 2,661,320 | Beckberger et al. | Dec. 1, 1953 |
| 2,779,714 | Keith | Jan. 29, 1957 |
| 2,849,379 | Hengstebeck | Aug. 26, 1958 |